(12) United States Patent
Shashkov et al.

(10) Patent No.: US 9,866,691 B2
(45) Date of Patent: *Jan. 9, 2018

(54) SYSTEM AND METHODS FOR PREDICTING FUTURE AGENT READINESS FOR HANDLING AN INTERACTION IN A CALL CENTER

(71) Applicant: GENESYS TELECOMMUNICATIONS LABORATORIES, INC., Daly City, CA (US)

(72) Inventors: Georgiy N. Shashkov, Berkeley, CA (US); Oleksiy M. Kolomoyskyy, Moraga, CA (US); Stanislav V. Zgardovski, Concord, CA (US); Nikolay Korolev, Concord, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,745

(22) Filed: Jun. 20, 2016

(65) Prior Publication Data

US 2016/0301804 A1 Oct. 13, 2016

Related U.S. Application Data

(60) Continuation of application No. 14/447,548, filed on Jul. 30, 2014, now Pat. No. 9,374,466, which is a
(Continued)

(51) Int. Cl.
*H04M 3/51* (2006.01)
*H04M 3/523* (2006.01)

(52) U.S. Cl.
CPC ....... *H04M 3/5175* (2013.01); *H04M 3/5158* (2013.01); *H04M 3/5191* (2013.01); *H04M 3/5238* (2013.01); *H04M 2203/6018* (2013.01)

(58) Field of Classification Search
None
See application file for complete search history.

(56) References Cited

U.S. PATENT DOCUMENTS 5,214,688 A * 5/1993 Szlam ................... H04M 3/36
379/111
5,544,220 A 8/1996 Trefzger
(Continued)

FOREIGN PATENT DOCUMENTS

JP 3349032 B2 11/2002
WO WO2004040889 A1 5/2004

OTHER PUBLICATIONS

First Office Action issued by the State Intellectual Property Offrice of the PRC for Chinese Application No. 201080023934.7, dated Oct. 10, 2013, with English translation, 12 pages.
(Continued)

*Primary Examiner* — Creighton Smith
(74) *Attorney, Agent, or Firm* — Lewis Roca Rothgerber Christie LLP

(57) ABSTRACT

A system for making outbound calls includes a first node connected to a network for placing outbound telephone calls, a second node connected to the network and accessible to the first node for reporting agent status relative to busy, ready, and time to ready, a number of agent appliances connected to the network and accessible to the second node, and a number of agent activity applications installed one per on the agent appliances. In a preferred embodiment outbound calls are predicted based on the number of agents reported ready to accept a call plus the number of agents
(Continued)

predicted to be ready to accept a call within a specified time window.

17 Claims, 5 Drawing Sheets

Related U.S. Application Data continuation of application No. 13/461,302, filed on May 1, 2012, now Pat. No. 8,798,257, which is a division of application No. 12/475,800, filed on Jun. 1, 2009, now Pat. No. 8,238,543.

(56) References Cited

U.S. PATENT DOCUMENTS

| | | | |
|---|---|---|---|
| 5,553,133 A * | 9/1996 | Perkins | H04M 3/36 379/111 |
| 5,570,419 A | 10/1996 | Cave et al. | |
| 5,640,445 A | 6/1997 | David | |
| 5,901,209 A | 5/1999 | Tannenbaum et al. | |
| 5,907,601 A | 5/1999 | David et al. | |
| 5,999,617 A | 12/1999 | Oyanagi et al. | |
| 6,466,664 B1 | 10/2002 | Zhao | |
| 8,238,543 B2 | 8/2012 | Shashkov et al. | |
| 8,798,257 B2 | 8/2014 | Shashkov et al. | |
| 9,374,466 B2 | 6/2016 | Shashkov et al. | |
| 9,456,086 B1 * | 9/2016 | Wu | H04M 3/5233 |
| 2003/0043832 A1 * | 3/2003 | Anisimov | H04L 29/06 370/412 |
| 2005/0084088 A1 | 4/2005 | Hamilton | |
| 2005/0100159 A1 | 5/2005 | Fink et al. | |
| 2006/0098583 A1 * | 5/2006 | Baker | G06F 11/0709 370/252 |
| 2006/0251237 A1 | 11/2006 | Singer | |
| 2009/0001650 A1 * | 1/2009 | Ishikawa | B65H 31/24 270/58.19 |
| 2010/0235371 A1 | 9/2010 | Bland et al. | |
| 2012/0213356 A1 | 8/2012 | Shashkov et al. | |
| 2016/0036979 A1 * | 2/2016 | Stubbe-Ostergaard | H04M 3/5158 379/265.11 |

OTHER PUBLICATIONS

International Search Report and Written Opinion issued by the European Patent Office for International Application No. PCT/US2010/035765, dated Aug. 31, 2010, 7 pages.

Office Action issued by the Japanese Patent Office for Japanese Application No. 2012-513975, dated Jun. 27, 2013, with English translation, 6 pages.

Office action issued by the Korean Intellectual Property Office for Korean Application No. 10-2011-728484, dated Jan. 22, 2013, with English translation, 8 pages.

European Patent Office Action for Application No. 10729963.8, dated Feb. 1, 2016, 3 pages.

Intellectual Property of India First Examination Report for Application No. 8443/CHENP/2011, dated Oct. 9, 2017, 6 pages.

* cited by examiner

SYSTEM AND METHODS FOR PREDICTING FUTURE AGENT READINESS FOR HANDLING AN INTERACTION IN A CALL CENTER

CROSS-REFERENCE TO RELATED APPLICATIONS

This application is a continuation of U.S. patent application Ser. No. 14/447,548, filed on Jul. 30, 2014, now U.S. Pat. No. 9,374,466, which is a continuation of U.S. patent application Ser. No. 13/461,302, filed on May 1, 2012, now U.S. Pat. No. 8,798,257, which is a divisional of U.S. patent application Ser. No. 12/475,800, filed on Jun. 1, 2009, now U.S. Pat. No. 8,238,543, the content of all of which are incorporated herein by reference.

BACKGROUND OF THE INVENTION

1. Field of the Invention

The present invention is in the field of telephony communications and pertains particularly to methods and apparatus for predicting future agent redness for handling an interaction in a call center.

2. Discussion of the State of the Art

In the field of telephony there are call centers that operate on behalf of companies that provide consumer goods and/or services to a base of consumers. A call center may be defined as an association of telecommunications equipment and live personal reserved for interacting with customers of one or more companies represented by the call center.

A state-of-art call center can handle telephone calls over a connection oriented switched telephone network and data network telephony (DNT) calls over an Internet protocol (IP) network. A call center typically includes a local area network (LAN) that supports agent appliances used for interaction. An agent appliance is generally a LAN-connected computer with a graphics user interface (GUI) running a client interface application. A telephone handset or headset is also part of the communication equipment used by an agent in interaction with customers. Telephones may be COST telephones or IP-based telephones.

Agents having similar training or skills are grouped together by association in some call centers for the purpose of working on specific call center campaigns. Outbound calling campaigns are one such campaign type that uses a group of focused call center agents. In an outbound calling campaign, a predicted number of outbound calls are placed, typically by an automated outbound dialer to customer telephone numbers provided by a list. Outbound calls are placed in batches at various periods throughout the duration of the campaign. Customers who answer calls placed by an outbound contact server may be routed to available call center agents as incoming calls for treatment. In many cases an interactive voice response (IVR) system is used to prompt customers who answer calls to wait a short period for a next available live agent. Once the customer is connected to the live agent an opportunity for conducting a transaction exists for the call center.

One challenge with outbound calling campaigns, especially when automated dialing systems are used, is predicting a best number of outbound calls to dial at any given dialing interval during the campaign. Probability theory is used in many predictive dialing operations to attempt to determine what a good number of outbound calls will be given a number of available agents. There is a probability that a percentage of calls placed will not be answered by a human. There is a probability that a percentage of calls placed and answered by customers will drop out of queue to be considered abandoned calls.

Two key principles that should be maintained during the campaign are that customers do not wait long to be connected to a live agent and that agents do not wait too long to receive a next call. A higher percentage of agent utilization in interaction handling for outbound call campaigns is desired in a call center environment, but many of the conventional means for determining agent readiness to handle a call, such as current predictive algorithms used in routing, fail to account for preliminary information about the status of the agent such as when a busy agent will be considered ready to take a call. Over dialing rate can rise beyond an acceptable level, call abandonment rate increases beyond an acceptable level, and agent utilization percentage becomes lower.

Therefore, what is clearly needed is a system and methods for placing outbound calls for connection to live agents that accounts for numbers of agents that are not available, but may be available by the time that outbound calls are answered.

SUMMARY OF THE INVENTION

The problem stated above is that a higher percentage of agent utilization in interaction handling for outbound call campaigns is desired in a call center environment, but many of the conventional means for determining agent readiness to handle a call, such as current predictive algorithms used in routing, fail to account for preliminary information about the status of the agent such as when a busy agent will be considered ready to take a call. Over dialing rate can rise beyond an acceptable level, call abandonment rate increases beyond an acceptable level, and agent utilization percentage becomes lower.

The inventors therefore considered functional elements of a call center, looking for elements that exhibit predictive capabilities that could potentially be harnessed to provide reliable agent readiness predictions but in a manner that would not create an over dial condition for outbound campaigns, a higher call abandonment rate, or lower agent utilization percentage average for the campaign.

Every call center campaign is driven by call load, one by-product of which is a percentage of dropped or abandoned calls resulting from a lack of ready agents to process calls. Most such call centers employ outbound contact utilities and internal routing systems to conduct the business of the call center, and contact servers, routers, and predictive routing strategies are typically part of such apparatus.

The present inventor realized in an inventive moment that if, at the point of dialing, a more reliable agent readiness prediction could be achieved for a group of agents working an interaction queue, a significant agent utilization percentage increase might result. The inventor therefore constructed a unique predictive routing system for call center outbound campaigns that allowed busy agents to be considered ready to take a call if the time window to become ready to take a call for the agent was equal to or less than a specified time window generally limited to the time to place and connect an outbound call for internal routing. A significant increase in agent utilization percentage results for groups of agents numbering 50 or less with no increases in call abandonment rates due to over dialing.

Accordingly, in one embodiment of the present invention, a system for making outbound calls is provided and includes a first node connected to a network for placing outbound telephone calls, a second node connected to the network and accessible to the first node for reporting agent status relative to busy, ready, and time to ready, a number of agent appliances connected to the network and accessible to the second node, and a number of agent activity applications installed one per on the agent appliances. In a preferred embodiment outbound calls are predicted based on the number of agents reported ready to accept a call plus the number of agents predicted to be ready to accept a call within a specified time window.

In one embodiment the outbound calls are dialed using a telephone dialer. In one embodiment the network is a local area network connected to the telephone network and to the Internet network. In one embodiment the first node is an outbound contact server with connectivity to the public switched telephone network through a telephone switch. In one embodiment the second node is a statistics server. In one embodiment the agent appliances are desktop computers and the agent activity applications are desktop interfaces. In one embodiment the calls are predicted according to calculation results produced by an algorithm using reported information about agent availability and pending availability to predict the correct number of calls to dial out.

According to another aspect of the present invention in an outbound telephone campaign, a method is provided for predicting the correct number of calls to dial out to best utilize a group of agents working the calls. The method includes the steps (a) summing the number of available agents waiting to take a call and agents who will be ready to take a call within a specified time window, (b) subtracting from the sum of (a) the number of connected calls waiting in queue for an agent, (c) predicting the admissible number of calls by adjusting the value of (b) against percentage constants relative to call hit rate and to a percentage of abandoned calls, and (d) further refining the value of (c) by subtracting the number of calls in progress.

In one aspect of the method in step (a) the specified time window is equal to or less than the average estimated time between the point of dialing out a call to the point that the call in progress is answered and queued. In this aspect in step (b) the connected calls waiting are outbound dialed calls that were answered by a customer and queued for an available agent. In this aspect in step (c) call hit rate is the percentage of outbound calls that are answered by a person. In one aspect in step (c) abandoned calls are abandoned in queue. In this aspect in step (d) calls in progress are current outbound calls yet to be answered.

According to another embodiment of the present invention, a system is provided for predicting when one or more agents associated with a call center and reported busy will be available to answer an interaction request. The system includes a monitoring application residing on the network locally to each appliance connected to the network each appliance operated by an agent, a reporting application residing one per appliance for reporting agent progress relative to defined tasks, and a data processing component for receiving information from the monitoring application and for determining which if any agents will be ready to accept an interaction request. Each reporting application sends notification to the monitoring application relative to current task performance state of the hosting agent and wherein the processing component calculates the time for each agent to become ready to take an interaction based on the reported state information.

In one embodiment the appliances are computers and the reporting applications are desktop agent interfacing applications. In this embodiment a task has one or more phases, each phase having a known average time to complete. In one embodiment the notifications are short message service notifications and the notification content includes current task identification and current phase identification.

In one embodiment the interaction requested is a live telephone interaction or a live chat session. In a preferred embodiment the data processing component is a routing server. In one embodiment the reporting application is manually operated to report phase state of the agent.

BRIEF DESCRIPTION OF THE DRAWING FIGURES

DETAILED DESCRIPTION

The inventors provide a system and methods for predicting agent availability for receiving a call in a call center environment. The present invention is described in enabling detail in the following examples, which may represent more than one embodiment of the present invention.

Figure 1:
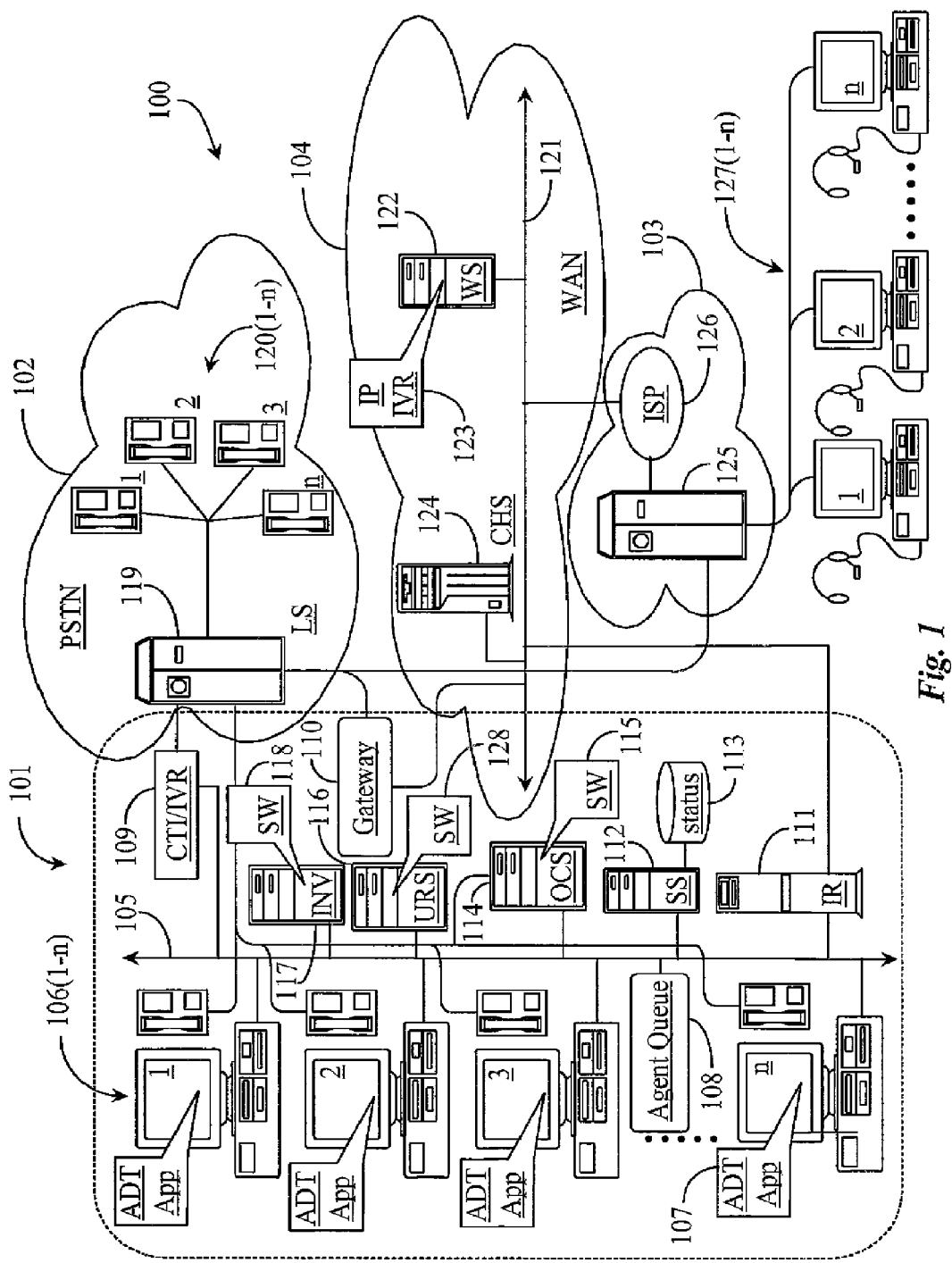
FIG. 1 is an architectural overview of a communications network supporting an outbound call system according to an embodiment of the present invention.

FIG. 1 is an architectural overview of a communications network 100 supporting an outbound call system according to an embodiment of the present invention. Communications network 100 includes a call center 101 having network connection to a public switched telephone network (PSTN) represented herein by a network cloud 102 and a network cloud 103. PSTN segment 102 represents a geographically local segment, as does PSTN segment 103. The PSTN segments 102 and 103 are physically separated in this example for discussion purposes only. One with skill in the art of network infrastructure will appreciate the ambiguity of network boundaries when discussing physical infrastructure. Connectivity to wireless telephone carrier networks may also be included logically in this example although none are illustrated for the purpose of saving space in the illustration. The PSTN network segments 102 and 103 shall represent any telephone network connectivity. The inventor chooses the PSTN network because of its high public access characteristics.

WAN 104 may be a private, corporate, or public network including a municipal area network (MAN), a corporate LAN connected to a WAN or the Internet network. The inventor chooses the Internet network in this example because of its high public access characteristic. Hereinafter in this specification WAN 104 may be referred to as Internet 104 according to a preferred embodiment. However, practice of the present invention is not limited to the Internet network or to the PSTN. Internet 104 is also represented herein by an Internet backbone 121, which represents all of the lines, equipment, and access points that make up the Internet as a whole. Therefore, there are no geographic limits to the practice of the present invention.

Call center 101 has a local area network (LAN) 105 disposed therein and adapted to connect various stations and equipment for network communication. LAN 105 supports a number of agent stations 106 (1-n). Agent stations 106 (1-n) are characterized generally in this embodiment as each comprising a desktop personal computer (PC) and a telephone. In this example each agent computer is LAN connected and each telephone is connected by way of internal telephone wiring to a local telephone switch (LS) 119 in PSTN segment 102. Telephone switch 119 may be an automated call distributor (ACD). In one embodiment LS 119 may be a private branch exchange (PBX) switch. LS 119 may be maintained within the physical domain of call center 101 and managed as a central office switch without departing from the spirit and scope of the present invention. In this example the switch is provided in the network and leased by the call center.

LS 119 is enhanced for intelligent routing and customer interface by a computer telephone integrated (CTI) processor 109 that also supports an instance of an interactive voice response unit. CTI processor 109 is connected to LAN 105 on the side of call center 101 and to LS 119 by way of a CTI link. A number of call center telephone contacts 120 (1-n) are illustrated within PSTN 102. Telephone contacts 120 (1-n) represented herein by telephone icons represent any customers of call center 101 that may contact the center or that may be contacted by the center using the telephone. In one embodiment, telephone contacts 120 (1-n) are outbound contacts made by call center 101 as part of an outbound call center campaign.

PSTN segment 103 includes a local telephone switch LS 125. LS 125 represents any telephone switches in the PSTN network that may be used to gain Internet access to Internet network 104. Telephone switch 125 is connected to LS 119 via a telephone trunk. A number of outbound invitees 127 (1-n) represent Web-connected customers of call center 101 who have access to Internet backbone 121 via Internet access lines to LS 125 via an Internet Service Provider (ISP) 126. Invitees 127 (1-n) are logically characterized as operating desktop personal computers (PCs), however they may gain access to Internet 104 using any Internet capable electronic appliance such as a smart phone, a personal digital assistant (PDA), a laptop, or some other network capable appliance. In this example the term invitee represents a state of invitation where invitations sent from call center 101 may be received by any of invitees 127 (1-n) for the purposes of participating in interaction with the call center. In one embodiment the invited interaction is online chat.

Invitees 127 (1-n) may be connected online to a Web server (WS) 122 illustrated in Internet 104 and connected to backbone 121. WS 122 includes a digital medium accessible thereto for storing executable software and for storing the required data to enable server function. WS 122 serves electronic information including Web page information to connected clients who access the information by universal resource locator and further Web browsing. Each computer may be assumed connected to network 104 using a Web browser as is known in the art. In this example WS 122 hosts a company Web site (not illustrated) for call center 101, which may be accessed by customers operating from computing appliances 127 (1-n). Invitees 127 (1-n) are also equipped with Internet protocol (IP) voice applications including headsets for practicing IP-voice telephony. An IP-based IVR platform 123 is hosted on the company Web site generic to call center 101 so that the call center may interact with invitees 127 (1-n) and any other computer network customers using voice recognition technology, which is well established in the art.

A chat server (CHS) 124 is illustrated within Internet 104 and connected to backbone 121. CHS 124 includes a digital medium accessible thereto for storing executable software and for storing the required data to enable server function. Chat server 124 hosts electronic chat sessions involving one or more customers and one or more agents from call center 101. Chat server 124 may be hosted by call center 104 or it may be leased or subscribed to by call center 104. A link may be provided on the Web site of call center 101 hosted in WS 122 to chat, which may redirect customers to server 124. Invitees 127 (1-n) may be invited to chat through outbound invitations sent to them electronically or by Voice over Internet Protocol (VoIP). In this example Internet connectivity for invitees 127 (1-n) is provided through ISP 126 and telephone connectivity through the PSTN. The method of Internet access may be integrated digital services network (ISDN), digital subscriber line (DSL), wireless broadband, T-X network connection, cable modem, satellite services, or the like.

It is noted herein that outbound contacts 120 (1-n) and outbound invitees 127 (1-n) represent customers of call center 101 whom have been contacted by call center 101 or the purpose of solicitation to some interaction hosted by the call center. Outbound contact initiated from call center 101 may take the form of an outbound telephone contact campaign or in the form of an electronically received invitation. Outbound voice contacts may be connection oriented switched telephony (COST) contacts or Internet Protocol Network Telephone (IPNT) calls including VoIP calls.

LAN 105 in call center 101 supports an Internet Protocol Router (IR) 111. IR 111 includes a digital medium accessible thereto for storing executable software and for storing the required data to enable router function. IR 111 provides Internet connectivity for LAN 105. IR 111 supports bi-directional voice calls, chat, and electronic messaging. LAN 105 is enhanced for transfer control protocol over Internet protocol (TCP/IP). LAN 105 supports an outbound contact server (OCS) 114. OCS 114 includes a digital medium accessible thereto for storing executable software and for storing the required data to enable server function. OCS 114 is equipped with an automatic telephone dialer (not illustrated) for placing outbound telephone calls on behalf of call center 101. OCS 114 can place COST calls via automated dialing software. OCS 114 may be used during an outbound call campaign to place calls to outbound contacts 120 (1-n). In one embodiment OCS 114 is enhanced to place IP-based outbound voice calls to outbound invitees 127 (1-n).

A statistics server (SS) 112 is illustrated within call center 101 and is connected to LAN 105. SS 112 includes a digital medium accessible thereto for storing executable software and for storing the required data to enable server function. SS 112 is adapted to compile statistics relevant to call center operations including real time statistics such as estimated waiting time (EWT) in queue and current availability states of agents operating from agent stations 106 (1-n). A statistics repository 113 is provided and connected to server 112 via a separate data link. Current status of agents operating at the center may be reported to SS 112 and stored for access in repository 113.

Agent computers are equipped with an agent desktop (ADT) application 107. One such application is illustrated on each computer in stations 106 (1-n). ADT 107 enables the agent to connect to and log into call center systems and applications and also provides specific communication and routing capabilities to the agent. In this embodiment ADT 107 is enhanced with a reporting capability in which the application can monitor and report specific agent states during communication and call center operation. For example, if an agent becomes ready to accept a telephone call, ADT 107 will report that state to SS 112. An agent telephone queue 108 is illustrated within call center 101 and is connected to LAN 105. Agent queue 108 represents a queue shared by agents operating at agent stations 106 (1-n). Agent queue 108 may be a virtual queue adapted to represent both COST telephony and data network telephony (DNT) events waiting for live assistance.

LAN 105 supports a universal routing server (URS) 116. URS 116 includes a digital medium accessible thereto for storing executable software and for storing the required data to enable server function. Executable software on URS 116 includes routing software (SW) 128. URS 116 supports both COST and DNT interactions. URS provides the intelligent routing strategies used to route interactions within call center 101 to appropriate agents and systems. For example, a call based at LS 119 requesting live assistance is routed internally based on instruction from URS 116. URS 116 may subscribe to SS 112 for current state information. CTI processor 109 calls URS 116 for routing instruction for each incoming call received at the switch.

LAN 105 supports an invite (INV) server 117. INV 117 includes a digital medium accessible thereto for storing executable software and for storing the required data to enable server function. INV 117 is adapted to generate outbound invitations to Web page visitors inviting them to participate in some interaction with call center 101 such as a chat session for example. The capability is known to the inventor and is the subject of an unrelated patent application. PSTN segment 102 is bridged to Internet 104 by a network gateway 110. The gate may be a SS-7 or other known gateway for bridging voice communications between the two networks.

In a preferred embodiment of the present invention, call center 101 may launch an outbound calling campaign where outbound contacts such as contacts 120 (1-n) are contacted by telephone and solicited to engage in some voice interaction with an agent of the call center. A pacing algorithm illustrated herein as SW 115 running on OCS 114 determines at each dialing interval, how many outbound calls to place in order to effectively distribute those calls that are answered by a human to agents that are available to take the connected calls as incoming calls.

Considerations for determining a number of outbound calls to place at any dialing interval during an outbound campaign include meeting quality of service (QoS) goals of call center 101. For example, it is preferred that available agents do not wait too long between calls. It is also preferred that customers do not wait too long for an available agent. It is therefore important that OCS 114 not place too few or too many calls at any dialing interval. This is accomplished in part by knowing the availability of agents working the campaign at the time calls are placed. There are also variables to consider such as the probability that a human will answer the telephone when an outbound call is placed to them (Hit Rate). This probability is expressed as a percentage of all calls placed during a dialing interval. A goal of the call center is to have a low and relatively constant call abandon rate. For example, if too many calls are placed and connected for too few agents then the percentage of calls that go abandoned because the customer waited too long for an agent may rise to an unacceptable level. Hence, over dialing must be kept to a minimum such as perhaps 5% of all calls placed during a dialing interval.

In typical outbound call campaigns known to the inventor, the outbound contact server only places calls for the number of agents determined to already be available to take a call. The system of the invention provides a unique enhancement that enables the system to account for already available agents and to predict from the decision point of placing calls how many agents that are busy will be available to take a call at the time placed calls are answered and internally routed. In order to accomplish an accurate prediction, ADT application 107 is enhanced with an ability to monitor agent tasks.

Agent tasks are quantified by application of task phases wherein each phase has an average handling time or duration. A task such as a telephone call of a specific type sale for example may have two or more phases. A phase may be defined as part of the task that is repeated each time the task is performed and that has an average duration, typically expressed in seconds. A sales call may have an average duration of 40 seconds, for example. The agent may have to compile product information in a first phase, confirm an order amount and take a credit card number during a second phase, and then process the order generating an electronic receipt and a shipping order in a final phase. Each phase may have an average duration of some division of 40 seconds for the whole task.

ADT 107 may automatically report to SS 112 in real time at every phase transition. For example at phase 1 of the specified task the agent has 40 seconds until he or she will be ready to accept a call. At the transition between phase 1 and phase 2 of the task the agent may have 20 seconds before he or she may be considered ready to accept a call. At the transition point between the second and last phase of the task the agent may have just 10 seconds before he or she can be considered available to accept a call. The preliminary agent state information is important because from the point of a dialing interval performed during the outbound campaign, so many seconds will pass before the calls dialed during the interval are answered by customers. This amount of time is averaged per dialing interval such that at the point of dialing the calls, OCS 114 aided by SW 115 will get the number of already available agents from URS 128 or directly from SS 112. OCS 114 then obtains the number of busy agents that are predicted to be available when calls placed will be answered and connected to queue.

Answered calls are then treated as incoming calls for the group of agents working the campaign and are routed to the available agents by URS 116 aided by SW 128. More calls may be placed and successfully routed without overrunning the abandonment rate by predicting the availability of a number of busy agents by the time calls are answered. In one embodiment of the present invention the predictive algorithm runs on OCS 114 as SW 115 and SS 112 keeps all of the current statistics in repository 113. The algorithm fires each time the system determines to lace another batch of telephone calls. Agents determined to be already ready to accept a call are those agents who are waiting for a call and will not be busy until answered calls are routed to them as incoming calls. Those agents predicted to be ready are busy agents that have remaining task time that is less than or equal to the average time window from call placement by the system to call answer and internal routing to agents.

In one embodiment of the present invention the predictive method is used for outbound Web invitations to participate in some interaction like chat for example. In this embodiment INV server 117 generates invitations to Web contacts like invitees 127 (1-n) who are detected browsing the company Web site hosted in WS 122. In this embodiment agents operating at stations 106 (1-n) are on tap to enter chat sessions set up between the agents and invitees who accept the chat invitations. Variables in this case are similar to outbound telephone contact in that the invitation system (INV server 117) aided by SW 118 determines a number of invitations to send out based on the predicted availability of agents to participate in chat sessions. One difference between the telephony method and the Web invitation method may be that an agent might be considered available for more than one accepted chat invitation assuming that the agent may run two or more chat windows simultaneously in the ADT application chat interface.

Hit rate is calculated and averaged for acceptance of chat invitations. An abandonment rate may be defined as the percentage of invitees who accepted chat invitations that drop off the grid due to high EWT in queue before a chat session is initiated for the invitee. The algorithm in this case runs on INV server 117 as SW 118. ADT application 107 reports agent status relative to busy or not busy to SS 112 for agents who are already available to chat at the time invitations are sent out. These agents are considered ready and are reserved for chat sessions based on the acceptance of chat invitations sent out. Busy agents that are predicted to be ready by the time invitations are accepted are considered ready by the system if the task time remaining for those agents is within a specified time window beginning at the time invites are sent out and ending at the time that those invitations are expected to be answered. Variables such as hit rate are calculated to predict the percentage of invitations sent that will be answered by invitees. A probability factor that invitations will be ignored or declined are figured into the average hit rate similar to the probability variable for telephone contacts, for example, busy, answered by machine, not answered, answered but declined, etc.

OCS 114 may dial outbound telephone calls through the path of CTI processor 109 and LS 119 to contacts 120 (1-n). In one embodiment OCS 114 dials calls through the path of IR 111 through gateway 110 to LS 119 and to contacts 120 (1-n). INV server 117 aided by SW 118 sends chat invitations through IR 111 to WS 122. In one embodiment of the invention chat invitations are included as voice prompt invitations made through IP/IVR platform 123 as synthesized voice invitations to invitees who are browsing the web site using a voice browser or who are interacting with the Web site (IP/IVR platform 123) using an IP voice telephony application. In one embodiment OCS 114 may place both COST calls and IP telephony calls at a single dialing interval during an outbound calling campaign. In this case there may be two-averaged time to answer windows, one for COST calls placed and another for IP calls placed. Incoming calls routed to agents can all be handled by telephone in one embodiment. In another embodiment IP calls are answered via computer telephony application while COST calls are handled by telephone.

Figure 2:
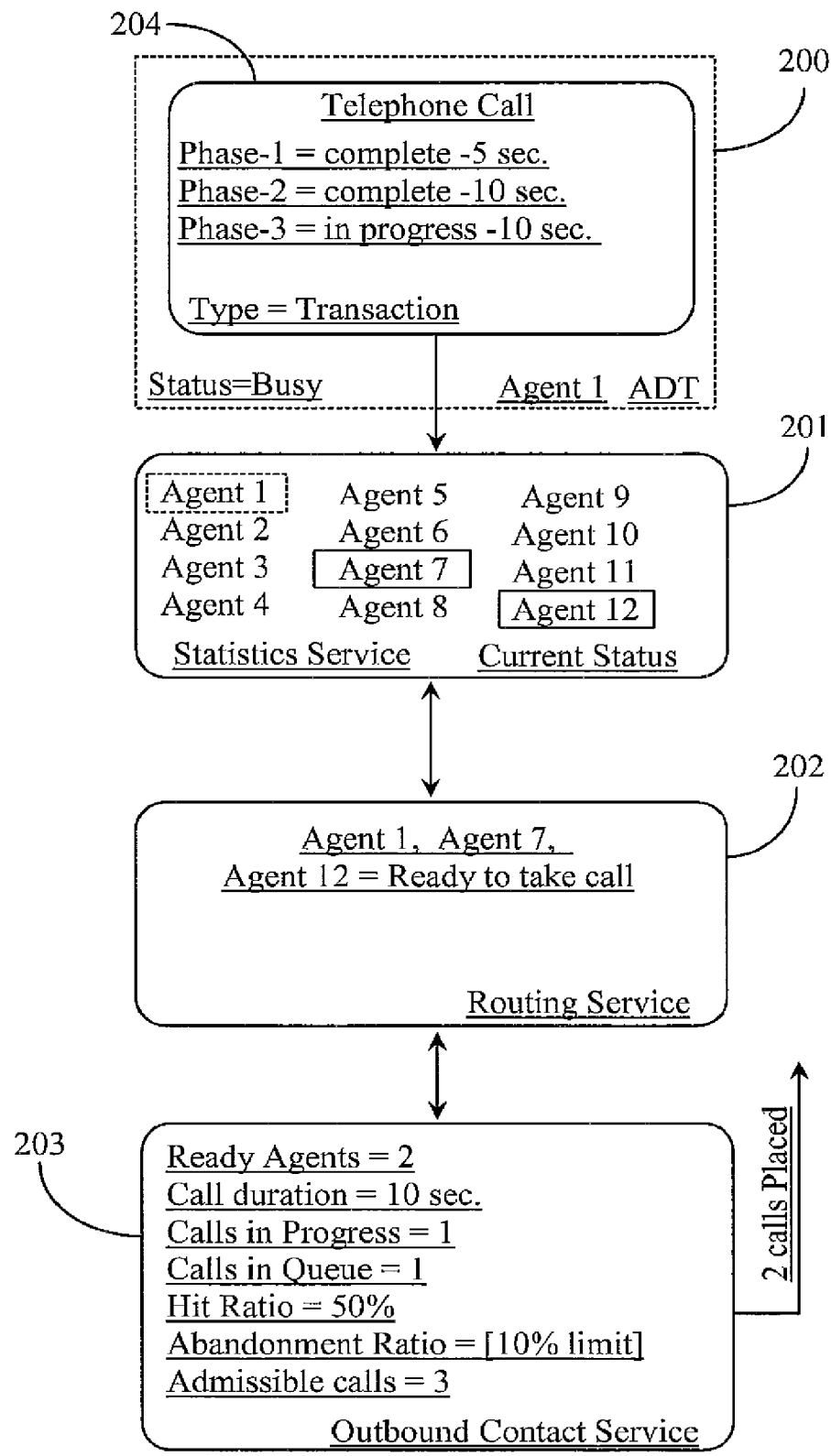
FIG. 2 is a block diagram illustrating basic components of an outbound call placement system and component interaction characteristics according to an embodiment of the present invention.

FIG. 2 is a block diagram illustrating basic components of an outbound call placement system and component interaction characteristics according to an embodiment of the present invention. An agent desktop application (ADT) 200 is illustrated in this example for an agent number 1 of 12 call center agents working in an outbound campaign. ADT 200 is analogous to ADT 107 of FIG. 1. Agent number 1 is considered busy with a task 204 that is defined as a telephone call of type transaction. In this example, the telephone call as three phases including phase-1 averaging 5 seconds to complete, a phase 2 that is completed in an average of 10 seconds and a phase 3 that is completed in an average of 10 seconds. In this example the entire task duration is 25 seconds. If the time it takes to answer outbound calls from placement of those calls is more than 25 seconds, then any agent who is currently busy with a telephone call of type transaction at the beginning of an outbound dialing interval is predicted to be ready to accept a call.

ADT 200 reports agent status in real time to SS 201. SS service 201 is analogous to SS server 112 and SW 113. There are 12 agents working in this small agent group. Of agents 1-12, the SS counts two of those agents already available to take a call. These are agents 7 and 12 who are considered already available to take a call. For example, agents 7 and 12 may already be available to accept a call and agent 1 may be predicted ready to take a call. In this example agent 1 is busy but has entered phase 3 of the task of type transaction telephone call.

In this example a routing service 202 analogous to URS 116 of FIG. 1 gets the information from the statistics service on behalf of an outbound contact service 203, which is analogous to OCS 114 of FIG. 1. In a preferred embodiment the method involves calculation of the number of available agents, which is defined as a number of agents who are already ready plus a number of agents who will become ready faster than some minimal dial duration for answered calls, minus the number of queued calls. There is one call in queue so the third agent that was predicted ready cancels out by the queued call leaving two ready agents.

The method also involves calculation of the admissible number of outbound calls, which can be dialed for the number of available agents and the estimated value of the hit ratio without overrunning the desired percentage of abandoned calls. Ultimately the method predicts the number of predictive calls that can be dialed. The number of predictive calls that should be dialed is the difference between the admissible number of outbound calls and the number of dialed calls defined as a call placed but not yet answered.

Referring now back to FIG. 2 there are 3 ready agents (two ready, 1 predicted). Subtract one call in queue to leave the two ready agents. The predicted agent and the single call in queue cancel out. The duration of a placed call from placement to answer is 10 seconds in this example. The hit ratio (calls that will be answered) is 50%. The acceptable abandoned rate for calls is 10%. Assume a current abandonment ratio of 8%, then the number of available agents is 2 (two ready agents plus a third agent minus one queued call).

The admissible number of calls that can be placed is three calls. The logic behind adding a call in this category is based on the expected percentage of abandoned calls being 8% (below 10% accepted rate). In this case the probability of abandoned calls is a constant 12.5% divided by the mean value of answered calls or 1.5 (12.5% divided by 1.5) =8.33%. One call can be abandoned with a probability of 12.5% I this example of 3 admissible calls. The expected mean value of answered calls is 1.5 (3 admissible calls multiplied by 0.5).

In this example the outbound contact service places two calls because there is one call dialed but not yet answered. Three admissible calls minus one dialed call=number of predictive calls that should be placed=two predictive calls. If the admissible number of calls were four calls instead of three calls, the expected percentage of abandoned calls will be greater than the maximum acceptable percentage of 10%. In this example we have preliminary information that agent 1 will be ready to take a call at or within the time limit imposed by the system as an average call duration (10 seconds). Without the preliminary information of the busy agents the predictive number of calls that should be dialed is 0. In this case the third agent would wait longer than normal for a call after becoming available in 10 seconds.

In one embodiment of the present invention the expected number of abandoned calls is equal to the number of answered calls minus the number of available agents. If the difference is greater than zero then the number of available agents is two. In this example the mean number of answered calls; the mean number of abandoned calls; and the expected percentage of abandoned calls are expressed in dependant fashion based on the number of calls placed by the dialer. For three calls given a hit ratio (percentage of answered calls) of 50% then the mean number of answered calls can be expressed as $3*\{p*(1-p)^2\}*1+3*\{p^2*(1-p)\}*2+p^3*3=12*0.125=1.5$. The mean number of abandoned calls may be expressed as $p^3*1=0.125$. The expected percentage of abandoned calls can be expressed as 0.125/1.5*100%=8.3%. Therefore, for 3 admissible calls the expected percentage of abandoned calls is lower than the acceptable limit in this example of 10%.

Given the parameters above, if the dialer were to attempt 4 calls the mean number of answered calls would be expressed as $4*\{p*(1-p)^3\}*1+6*\{p^2*(1-p)^2\}*2+4*\{p^3*(1-p)\}*3+p^4*4=32*0.0625=2$. the mean number of abandoned calls would be $4*\{p^3*(1-p)\}*1+p^4*2=6*0.0625=0.375$. The expected percentage of abandoned calls would be 0.375/2*100%=18.75%. The expected call abandon rate would be greater than the acceptable maximum of 10%. A condition of call placement is that the expected call abandonment percentage should not exceed a relatively low acceptable level, in this example 10%. In this example 2 calls are placed because the probability is that only one call will be routed to the third agent who will be ready at the time of the customer answers the call.

In a preferred embodiment of the invention the outbound dialing server employs the predictive method for determining a correct number of outbound calls to place in campaigns that utilize 50 or fewer agents. This type of agent group may be considered a small group.

Figure 3:
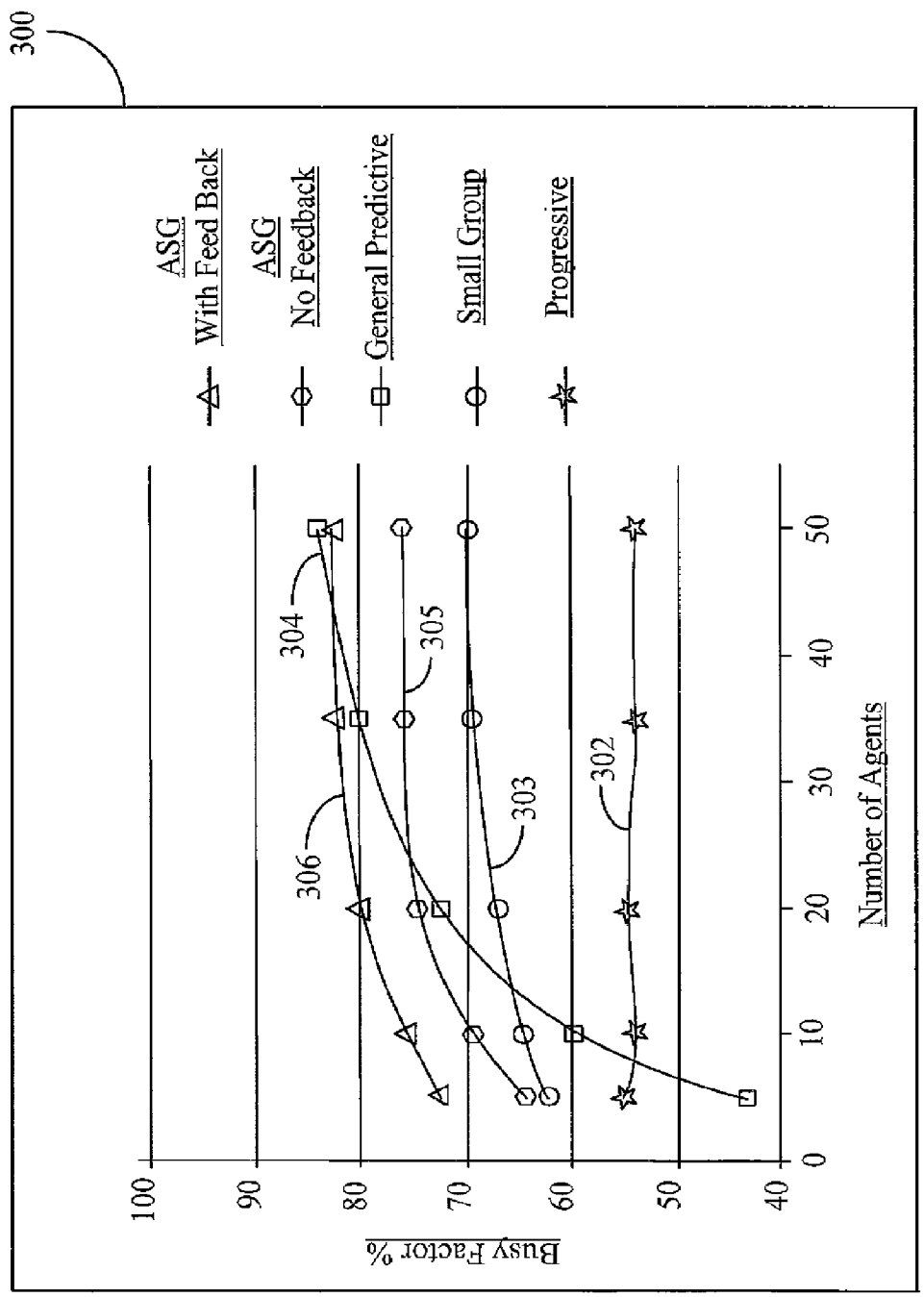
FIG. 3 is a line chart illustrating results of empirical testing of the system of the invention compared to other systems for similar numbers of agents.

FIG. 3 is lines graph 300 illustrating results of empirical testing of the system of the invention compared to other systems for similar numbers of agents. Graph 300 plots the average agent utilization factor or "busy factor" for agents working separate outbound campaigns that use different methods for predicting call placement. The maximum number of agents used is 50, which is indicative of a small group of agents. For all of the tests the hit ratio=0.3 (probability-answer=0.3, probability-no-answer=0.5, probability-busy=0.2). Call duration is to be around 40 seconds. The parameter for comparison is the busy factor of the agents in the group expressed as a percentage.

For small groups of 5 to 50 agents a progressive dialing method known to the inventors and illustrated herein using a star icon to plot curve 302 remains relatively flat as illustrated by plotted results curve 302 for all small group numbers of agents up to 50. Average agent busy factor remains relatively low at about 55% for the selected small groups. A method for small groups is more effective and is illustrated herein using a circle in the plotting of a results curve 303. This method returns a 62% busy factor for approximately 5 agents. Curve 303 rises steadily with more agents achieving a 70% busy factor for groups of fifty agents. One method classed as a general predictive method and illustrated herein by a rectangular icon produces a results curve 304 that has very poor performance for smaller groups of agents and much better performance for agent groups between 35 and 50 agents. For 5 agents the method results in less than 45% busy factor for the agents. The percentage rises to 60% at 20 agents, 80% at 35 agents and 85% at 50 agents. The method is much less reliable at smaller numbers of agents.

An agent small group (ASG) method known to the inventor and illustrated herein by a hexagon produces a results curve 305. Curve 305 rises dramatically from 5 agents to 20 agents achieving 75% busy factor for a group of 20 agents. After rising to 75% agent busy factor for a small group of 20 agents, it flattens out and the busy factor remains flat up to a group size of 50 agents.

The method of the present invention for agent small group (ASG) with feedback (preliminary availability prediction for busy agents) produces a results curve 306. For very small agent groups of as low as five agents the agent busy factor is about 72%. The curve rises dramatically for larger groups up to 3 to 40 agents where the busy factor for the agents is about 83%. For 50 agents the general predictive method results in a slightly higher busy factor for agents of about 85% compared to 83%. However the method of the invention out performs the general predictive method and all of the other known methods for agent groups below 45 agents. A higher busy factor for agents means that the agents are better utilized during the campaign.

Figure 4:
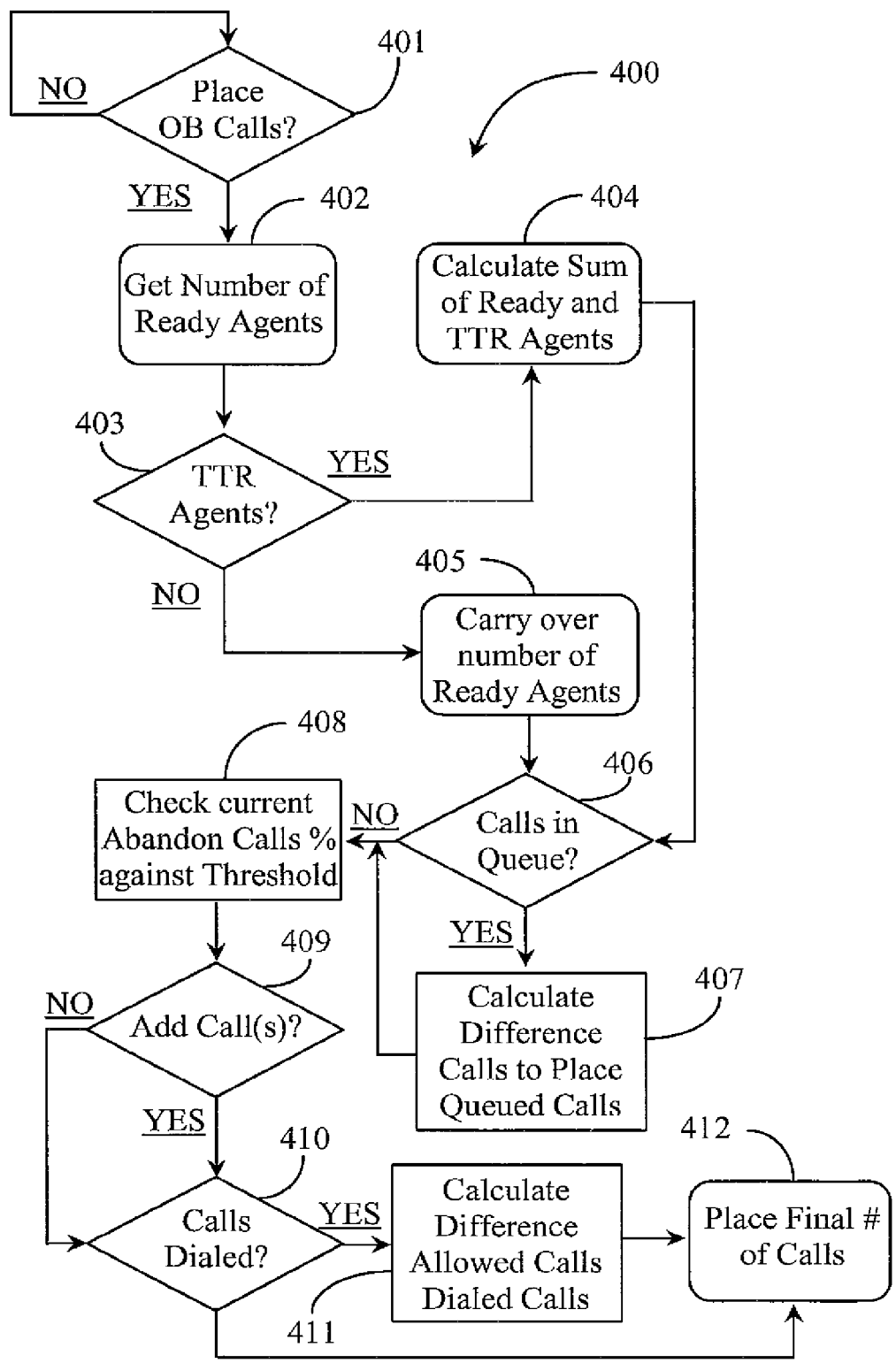
FIG. 4 is a process flow chart illustrating steps for predicting a correct number of outbound calls to place at a given placement interval according to an embodiment of the present invention.

FIG. 4 is a process flow chart illustrating steps 400 for predicting a correct number of outbound calls to place at a given call placement interval during an outbound call campaign according to an embodiment of the present invention. At step 401 the system determines whether or not to place outbound calls. This determination may be made based on availability information of agents obtained from real time statistics. If the system decides not to place calls then the process loops back until a determination to place calls is made by the system at step 401.

At step 402 the system gets the number of ready agents defined as agents working the campaign who are already ready to take a call. The system then determines at step 403 if there are any time-to-ready (TTR) agents to consider. A TTR agent is a busy agent that will become a ready agent within a specified time frame equal to or less than the time it takes for customers to answer calls placed by the system (call duration). For example a TTR agent may be available in 10 seconds where the call duration is 15 seconds. That agent will be considered available with the ready agents for call placement. A TTR agent with a time greater than 15 seconds would not be considered available for the current call placement interval.

In one embodiment agents themselves manually report to statistics upon receiving a notification of a pending call placement interval. In this example the agent estimates the TTR value and reports it through the agent desktop application. In another embodiment the ADT application is enhanced to monitor agent state relative to task stages or phases that have been assigned average completion times. In this example the agent desktop automatically reports to the statistics server each time the agent transitions from one phase of a current task to another. The system knows from available data (Phase 1=10 seconds, phase 2=10 seconds, etc.) how much time is left before the task of the agent will be completed.

If the system determines that there are no TTR agents to consider for the current call placement interval at step 403 then the system carries over the number of ready agents at step 405. If the system finds TTR agents that qualify for consideration of availability at step 403, then the system calculates the sum of the ready and qualified TTR agents at step 404. At step 406 the system checks to see if there are any calls in queue regardless of whether TTR agents were considered or not. If there are no calls currently in queue at step 406 the system does not have to subtract any number from the number of available agents. At step 408 the system may check the current % of abandoned calls to see if it is below the maximum percentage allowed.

If the system determines at step 406 that there are one or more calls in queue for agents from the last call placement interval the system calculates the difference between the available agents and the call(s) in queue. More particularly the system deducts the number of TTR agents from the total based on the number of calls in queue. If there is one call in queue the system will deduct or cancel out one TTR agent. If there were no TTR agents to consider then the system removes a ready agent from consideration. It is noted herein that in the case of TTR agents the system removes the TTR agent with the highest time-to-ready number if there is more than one TTR agent. The process moves from step 407 to step 408 where the system checks the call abandonment percentage against an allowable threshold.

At step 409 the system determines whether to add calls to a nominal number of calls to place for ready agents. The system determines the number of admissible calls to place based on the available information including consideration of the call abandonment percentage. Admissible calls include the calls for ready agents and calls for TTR agents still considered available after deduction for calls in queue.

If the system determines at step 409 that no calls will be added to the nominal number of calls to be placed, then at step 410 the system checks to see if there are any calls dialed from the last interval that have not yet been answered by a customer. If the system determines that there are no dialed calls at step 410 then the system places the final calculated number of outbound calls at step 412. If the system decides to add calls to the nominal total at step 409 the number of calls added would be limited to a number that will not result in overrun of the desired call abandonment percentage. The process moves to step 410 where the system checks if there are any dialed calls. If the system determines that there is one or more dialed calls at step 410 the system calculates the difference between the allowable or permissible number of calls and the number of dialed calls at step 411. More particularly, the system deducts number of dialed calls from the number of allowed or permissible calls. The system then places the correct number of outbound calls at step 412. The goal of the method is to place just enough calls to keep the call abandonment rate down to an acceptable level while optimally utilizing the agents' time working the campaign.

Figure 5:
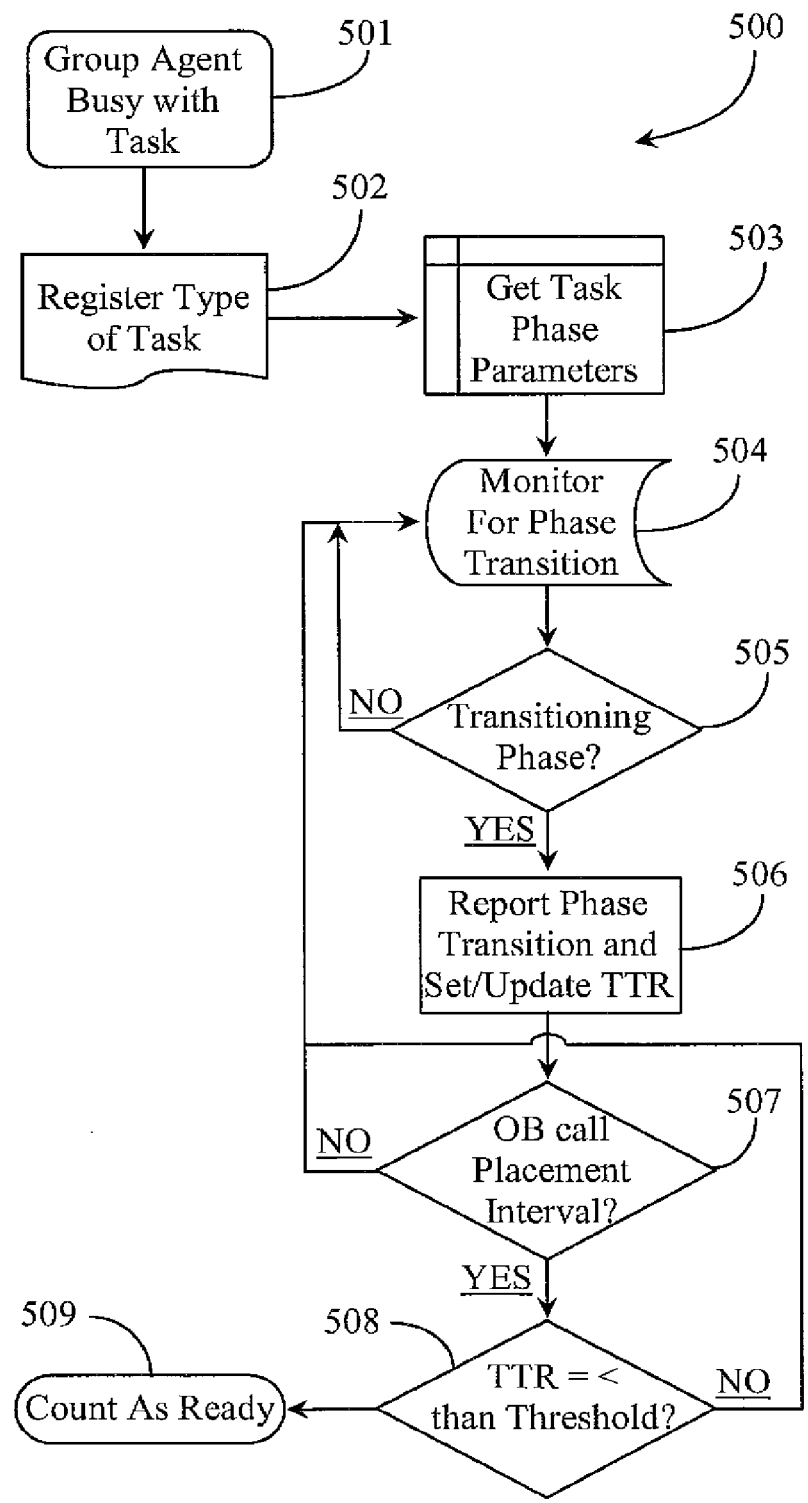
FIG. 5 is a process flow chart illustrating steps for updating time-to-ready information for predicting availability of an agent for call placement according to an embodiment of the present invention.

FIG. 5 is a process flow chart illustrating steps 500 for updating time-to-ready information for predicting availability of an agent for call placement according to an embodiment of the present invention. At step 501 a group agent is busy with a task. At step 502 the system registers the type of task. The task may be a telephone call of a specific type such that the routine nature of the call enables the call to be quantified in stages or phases that have predicted times to completion.

At step 503 the system gets the task phase parameter for the type of task registered at step 502. The phase parameters consist of the times allotted for each phase of the task. At step 504 the system monitors the agent while he or she is working the task for phase transition. The monitoring component may be local to the agent such as in the agent desktop application running on the agent's computer in the workstation of the agent. In one embodiment where the task is a COST call the monitoring component may be implemented in the CTI processor controlling the telephone switch used by the call center. In another embodiment each agent busy with a task at an outbound call placement interval is responsible for reporting to a statistics server via the agent desktop application the time that the agent is expected to be ready to take a call. The act of reporting in this case may be initiated upon receipt of a notification that the system will be placing a next round of outbound calls. The notification may appear as a pop up or toast graphic in the agent desktop application. The report might be a short message service (SMS) message or some other text message that can be understood by the contact server and dialing system.

In one embodiment the agent desktop application is enabled to report agent status automatically without intervention by the agent. In this case the application reports when the agent transitions from one task phase to the next. The system then may calculate the time to completion of the task for every busy agent working the campaign. In a variation to this embodiment the monitoring component may actively track the time from the point the agent became busy on a task until the time the agent completes the task and becomes available again with the understanding that at any time a query may arrive that asks for a report of the current time to completion of the task. In this case task stages or phases may be unnecessary. The value of time-to-completion of the task is analogous to TTR described in FIG. 4 and may be expressed in the number of seconds remaining before the agent is ready.

The monitoring component determines at step 505 for a busy agent if the agent is transitioning phase. If at step 505 the monitor determines that an agent is not transitioning phase then the process loops back to the monitoring step 504 for the busy agent. In the case of desktop monitoring each agent has their own monitoring and reporting system. However in one embodiment all agents working the campaign that become busy are monitored from a central location like a CTI processor or some other server connected to the computing network used by the agents and the system of the invention.

If the monitoring component determines at step 505 that an agent is transitioning phase of a task, then at step 506 the agent desktop application may report the phase transition to a statistics server and may set or update any TTR information currently in the system. For example a call may have two phases the first of which takes an estimated 20 seconds to complete and the second of which takes 10 seconds to complete. At the first phase the busy agent is reported to have a TTR value of 30 seconds. When the second phase is initiated the agent is reported to have a TTR value of 10 seconds. After 10 seconds expires the agent is reported ready. Step 506 occurs for every busy agent that is working the campaign.

At step 507 the statistics server may determine if an outbound call placement interval has been initiated. If the system has initiated an OB call placement interval then at step 508 the system determines if the TTR for a busy agent is equal to or less than a threshold representing average call duration (time of outbound call placement till the call is answered). Step 507 occurs for every busy agent working the campaign.

If the system has not initiated an outbound calling interval at step 507 the process resolves back to step 504 for continued agent task performance monitoring. If an outbound calling interval has been initiated by the system at step 507 it means that the system has determined the presence of at least one ready agent to take a call. In this case at step 508 the system checks TTR values reported for busy agents against a threshold to determine how many TTR agents may be considered with agents that are already ready to accept calls. Step 508 is preformed for every busy agent.

At step 508 if the TTR is greater than the threshold for an agent that agent is considered busy and not available for the current round of call placement. This is true for each busy agent reporting. If the system determines for an agent that the TTR value of the agent is equal to or less than the threshold value then at step 509 that agent is considered or counted as available or ready. It is noted herein that the system maintains differentiation between ready agents and TTR agents. In the case that there are queued calls, the TTR agents are removed from consideration first because their status of available is only a prediction. It is possible that a TTR agent actually becomes available some time after the predicted TTR expires, perhaps many seconds later if there was a problem with task completion. In that case the call designated for that agent may wait in queue for the agent to become available or for a next agent to become available. An agent may also become ready before a TTR expires. In this case the system counts the agent as ready instead of a TTR agent.

The method of the present invention including the method for monitoring and classifying agents based on ready or TTR may be implemented in a proactive Web-based invitation campaign such as a proactive chat campaign. There may be some differences in how the chat session will be staged as a routine task because of the unpredictable nature of chat interaction. However, if the chat is structured with a purpose in mind similar to a structured telephone call such as a transaction, then an average time to completion can be assessed over time and assigned to the chat sessions. Other structured live communication sessions between an agent and a customer may also be staged like instant message conversations and the like.

It will be apparent to one with skill in the art that the predictive availability determination methods and system of the invention may be provided using some or all of the mentioned features and components without departing from the spirit and scope of the present invention. It will also be apparent to the skilled artisan that the embodiments described above are specific examples of a single broader invention, which may have greater scope than any of the singular descriptions taught. There may be many alterations made in the descriptions without departing from the spirit and scope of the present invention.

What is claimed is:

1. A method for initiating outbound interactions comprising:
   determining, by a processor, a preliminary number of outbound interactions based on a first number of agents identified as ready to handle interactions, a second number of agents identified as agents predicted to be ready to handle interactions within a time period, and a number of outbound interactions answered by one or more customers and waiting to be handled by one or more agents;
   determining, by the processor, an admissible number of outbound interactions by adjusting the preliminary number of outbound interactions based on an interaction hit rate; and
   transmitting, by the processor, a command for initiating outbound interactions based on the admissible number of outbound interactions,
   wherein the determining of the preliminary number of outbound interactions comprises:
   summing, by the processor, the first and second numbers of agents; and
   calculating, by the processor, the preliminary number of outbound interactions by subtracting a number of interactions in progress from the summed first and second numbers of agents.

2. The method of claim 1, further comprising:
   receiving, by the processor, agent statuses from agent devices, each of the agent statuses indicating a progress of a corresponding agent relative to a defined task; and
   determining, by the processor, the first and second numbers of agents based on the received agent statuses.

3. The method of claim 1, wherein the outbound interactions are outbound telephony calls and the number of interactions is a number of outbound dialed calls that were answered by a customer and queued for an available agent.

4. The method of claim 1, wherein the interaction hit rate is a percentage of outbound interactions that are responded to by a person.

5. The method of claim 1, wherein the determining of the admissible number of outbound interactions further comprises adjusting the preliminary number of outbound interactions based on a percentage of abandoned interactions, and
   wherein the abandoned interactions are abandoned in queue.

6. The method of claim 1, wherein the interactions in progress are current outbound interactions yet to be responded to by a user.

7. The method of claim 1, wherein one of outbound interactions is a live telephone interaction or a live chat session.

8. A method for initiating outbound interactions comprising:
   determining, by a processor, a preliminary number of outbound interactions based on a first number of agents identified as ready to handle interactions, a second number of agents identified as agents predicted to be ready to handle interactions within a time period, and a number of outbound interactions answered by one or more customers and waiting to be handled by one or more agents;
   determining, by the processor, an admissible number of outbound interactions by adjusting the preliminary number of outbound interactions based on an interaction hit rate; and
   transmitting, by the processor, a command for initiating outbound interactions based on the admissible number of outbound interactions,
   wherein the time period is equal to or less than an average estimated time between a point of initiating an interaction to a point that the interaction is responded to and queued.

9. A system for initiating outbound interactions comprising:
   a processor; and
   a memory, wherein the memory stores instructions that, when executed by the processor, cause the processor to:
   determine a preliminary number of outbound interactions based on a first number of agents identified as ready to handle interactions, a second number of agents identified as agents predicted to be ready to handle interactions within a time period, and a number of outbound interactions answered by one or more customers and waiting to be handled by one or more agents;

determine an admissible number of outbound interactions by adjusting the preliminary number of outbound interactions based on an interaction hit rate; and transmit a command for initiating outbound interactions based on the admissible number of outbound interactions, wherein the time period is equal to or less than an average estimated time between a point of initiating an interaction to a point that the interaction is responded to and queued.

10. The system of claim 9, wherein the instructions further cause the processor to:

receive agent statuses from agent devices, each of the agent statuses indicating a progress of a corresponding agent relative to a defined task; and determine the first and second numbers of agents based on the received agent statuses.

11. The system of claim 9, wherein the instructions that cause the processor to determine the admissible number of outbound interactions comprise instructions that cause the processor to: further refine the admissible number of outbound interactions by subtracting a number of interactions in progress.

12. The system of claim 9, wherein the outbound interactions are outbound telephony calls and the number of interactions is a number of outbound dialed calls that were answered by a customer and queued for an available agent.

13. The system of claim 9, wherein the interaction hit rate is a percentage of outbound interactions that are responded to by a person.

14. The system of claim 9, wherein instructions further cause the processor to determine the admissible number of outbound interactions by further adjusting the preliminary number of outbound interactions based on a percentage of abandoned interactions, and wherein the abandoned interactions are abandoned in queue.

15. The system of claim 9, wherein one of outbound interactions is a live telephone interaction or a live chat session.

16. A system for initiating outbound interactions comprising:

a processor; and a memory, wherein the memory stores instructions that, when executed by the processor, cause the processor to:

determine a preliminary number of outbound interactions based on a first number of agents identified as ready to handle interactions, a second number of agents identified as agents predicted to be ready to handle interactions within a time period, and a number of outbound interactions answered by one or more customers and waiting to be handled by one or more agents;

determine an admissible number of outbound interactions by adjusting the preliminary number of outbound interactions based on an interaction hit rate; and transmit a command for initiating outbound interactions based on the admissible number of outbound interactions, wherein the instructions that cause the processor to determine the preliminary number of outbound interactions comprise instructions that cause the processor to:

sum the first and second numbers of agents; and calculate the preliminary number of outbound interactions by subtracting a number of interactions in progress from the summed first and second numbers of agents.

17. The system of claim 16, wherein the interactions in progress are current outbound interactions yet to be responded to by a user.

* * * * *